(12) United States Patent
Chatterjee et al.

(10) Patent No.: US 7,885,843 B2
(45) Date of Patent: Feb. 8, 2011

(54) COMPUTER-IMPLEMENTED DECISION SUPPORT SYSTEM AND METHOD

(75) Inventors: Goutam Chatterjee, Fremont, CA (US); Dallan Clancy, Belmont, CA (US); Martin Chen, Los Gatos, CA (US)

(73) Assignee: SAP AG, Walldorf (DE)

( * ) Notice: Subject to any disclaimer, the term of this patent is extended or adjusted under 35 U.S.C. 154(b) by 1321 days.

(21) Appl. No.: 10/931,168

(22) Filed: Aug. 31, 2004

(65) Prior Publication Data

US 2006/0047549 A1    Mar. 2, 2006

(51) Int. Cl.
*G06F 9/46* (2006.01)
(52) U.S. Cl. .............................................. 705/8; 705/9
(58) Field of Classification Search ...................... 705/8, 705/9
See application file for complete search history.

(56) References Cited

U.S. PATENT DOCUMENTS

| | | | | |
|---|---|---|---|---|
| 5,291,394 A | * | 3/1994 | Chapman | 705/8 |
| 5,406,476 A | * | 4/1995 | Deziel et al. | 705/8 |
| 5,408,663 A | * | 4/1995 | Miller | 718/104 |
| 5,457,792 A | * | 10/1995 | Virgil et al. | 707/3 |
| 5,630,070 A | * | 5/1997 | Dietrich et al. | 705/8 |
| 5,765,140 A | * | 6/1998 | Knudson et al. | 705/9 |
| 5,826,082 A | * | 10/1998 | Bishop et al. | 718/104 |
| 6,101,481 A | * | 8/2000 | Miller | 705/9 |
| 6,308,164 B1 | * | 10/2001 | Nummelin et al. | 705/9 |
| 6,678,714 B1 | * | 1/2004 | Olapurath et al. | 718/104 |
| 6,748,582 B1 | * | 6/2004 | Chiles et al. | 717/111 |
| 6,944,622 B1 | * | 9/2005 | Mitchell et al. | 707/102 |
| 7,340,679 B2 | * | 3/2008 | Botscheck et al. | 715/738 |
| 7,389,335 B2 | * | 6/2008 | MacLeod et al. | 709/223 |
| 2003/0069869 A1 | * | 4/2003 | Gronau et al. | 706/46 |

* cited by examiner

*Primary Examiner*—Johnna R Loftis
(74) *Attorney, Agent, or Firm*—Kenyon & Kenyon LLP

(57) ABSTRACT

The invention concerns a computer-implemented decision support system and method, that determines the availability of work items and areas of responsibility, determines the feasibility of completing the work item tasks based on the determined availability of work items and the determined areas of responsibility, determines precedence of the work item tasks to be performed based on the determined feasibility, the determined availability of work items, and the determined areas of responsibility, and outputs one or more worklists that list work item tasks to be performed based on the determined precedence and the determined feasibility of the work item tasks.

16 Claims, 8 Drawing Sheets

Work Items

Show | WI: Setup Filling Line, Cleaning BT | ▼ | Get | ▼ | | Go | Advanced

| | Item Type | Description | Due Tm | Feasibility | Priority |
|---|---|---|---|---|---|
| ■ | Proc. St. | Setup:Filling Line3:Ord 4711:GBU_M Lrg Pck:Tgt. Qty. 50 | | ◉ | 1 |
| ☐ | Proc. St. | Setup:Filling Line4:Ord 4711:GBU_M Lrg Pck:Tgt. Qty. 50 | | ◉ | 1 |
| ☐ | Set/tear | Cleaning:Bulk Tank BT3:Res. Status Idle | | ◉ | 2 |
| ☐ | Proc. St. | Setup:Filling Line5:Ord 4712:GBU_M sml pck:Tgt. Qty. 100 | | ● | 3 |
| ☐ | Proc. St. | Setup:Filling Line6:Ord 4712:GBU_M sml pck:Tgt. Qty. 50 | | ● | 3 |

Item Detail | Work Instruction | Components | Feasibility detail

| Result | Filter Description | Filter Type | Messages |
|---|---|---|---|
| ◉ | Component Availability | Mandatory | Packaging Box Available: Qty. 75 |
| | | | Packaging Tape Available |
| | | | Large Bottle Available: Qty. 650 |
| ◉ | Resource Availability | Optional | Resource Status: Idle |

*Figure 6*

COMPUTER-IMPLEMENTED DECISION SUPPORT SYSTEM AND METHOD

TECHNICAL FIELD OF THE INVENTION

The invention relates to the field of a computer-implemented management tools. More particularly, the present invention relates to processing of various parameters to aid the decision making tasks of production managers.

BACKGROUND OF THE INVENTION

In any business that is based on production of components or entire products in hard goods, soft goods, perishables, etc., efficient production management can be major key to increased production and increased profitability. However, production managers and process developers are often mired in infinite details of determining the availability of work in-progress, what resources are currently available, and what tasks (work items) need to be performed next. If production management errors are made, the entire production process suffers. For example, performing production steps out of sequence or finishing products stages prior to having other component ready, lead to costly delays and ultimately raise overall production costs per unit produced.

BRIEF DESCRIPTION OF THE DRAWINGS

FIG. 6 is an example of a possible worklist generated by the computer-implemented decision support process of FIG. 3 in accordance with an embodiment of the present invention.

DETAILED DESCRIPTION

Whether it is in an office environment or on an assembly line floor, production line managers have the difficult task of keeping production costs as low as possible in order to increase profitability of the product line. One major area of focus in this task is the goal of increasing and maintaining efficiency in the production process. For example, while manufacturing shop floor personnel are often faced with the question as to what task they should perform next, if the wrong decision is made, efficiency suffers.

Thus the invention concerns a decision support system and method that provides a production manager or shop floor person, for example, with a prioritized list of work items and/or tasks to help maintain efficiency in the production process. In providing the worklist, the system and method may evaluate whether a work item is feasible given the current production environment and the inventory available, and then evaluate the precedence of a work item relative to others according to a policy instituted by the production manager. The system and method also allow for re-evaluating the worklist based on a loss of workers due to illness and/or loss of equipment due to failure, for example.

Figure 1:
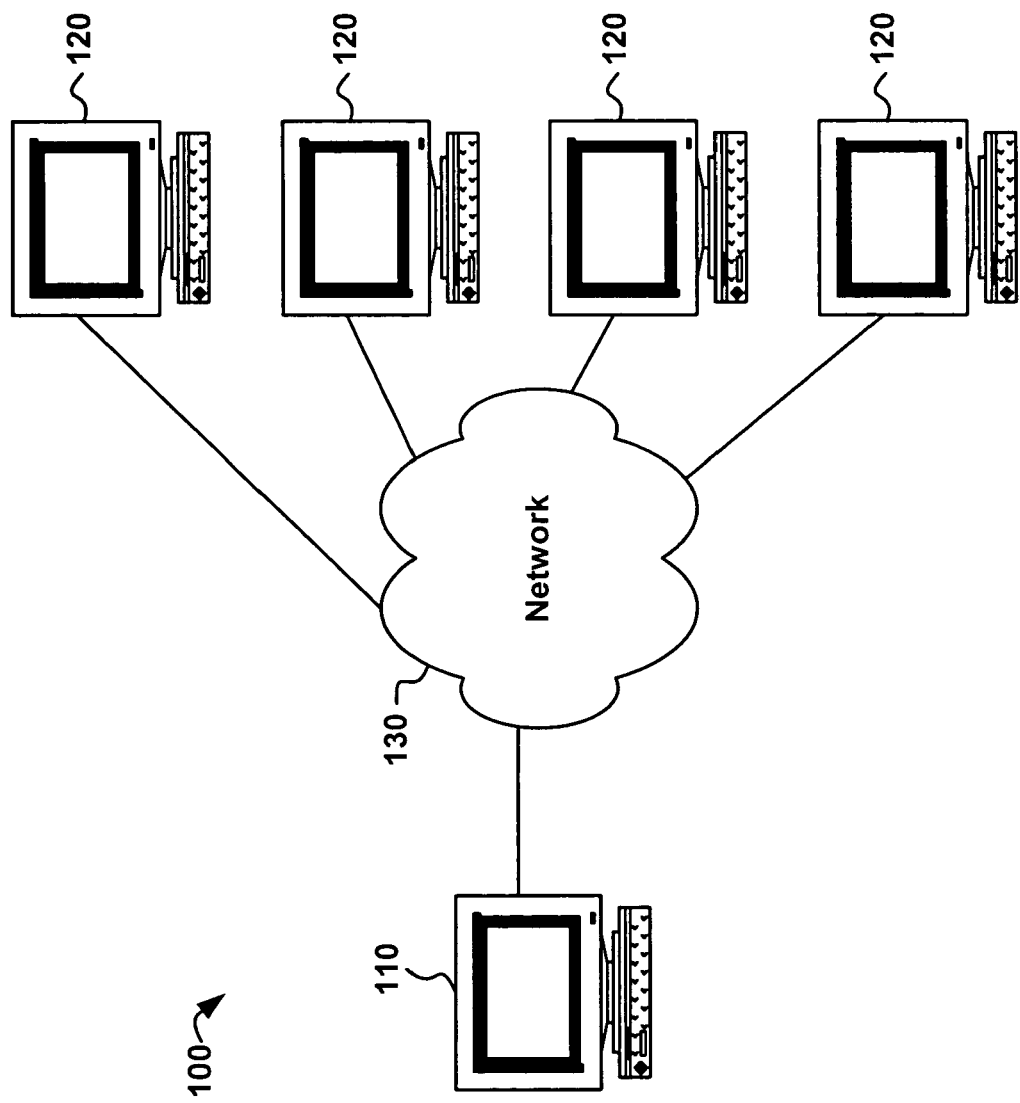
FIG. 1 is a block diagram that depicts a possible computer-implemented decision support system in accordance with an embodiment of the present invention.

FIG. 1 illustrates the components of a possible system and basic computer and network architecture that may implement the decision support method in accordance with an embodiment of the present invention. The decision support system 100 includes a master terminal 110 and one or more user terminals 120 connected through a network 130. The production manager may implement the decision support method from the master terminal 110, or alternatively, from one of the user terminals 120 or from any other device that may implement the method and is linked or connected in some manner to the system 100. The user terminals 120 may receive reports and instructions resulting from the decision support method, as well as any other additional information or instructions from the production manager or co-workers.

One or more of the terminals 110, 120 may be personal computers, computer workstations, handheld personal digital assistants ("PDA"), or any other type of microprocessor-based device.

The network 130 may be a local area network (LAN), wide area network (WAN), remote access network, an intranet, or the Internet, for example. Network links for the network 130 may include telephone lines, DSL, cable networks, T1 or T3 lines, wireless network connections, or any other arrangement that implements the transmission and reception of network signals. However, while FIG. 1 shows the terminals 110, 120 connected through a network 130, the terminals 110, 120 may be connected through other means, including directly hardwired or wirelessly connected. In addition, the terminals 110, 120 may be connected to other network devices not shown, such as wired or wireless routers and servers. The terminals 110, 120 may also be connected to one or more peripheral devices, such a local or network printer, mouse, display, storage drives, etc.

Figure 2:
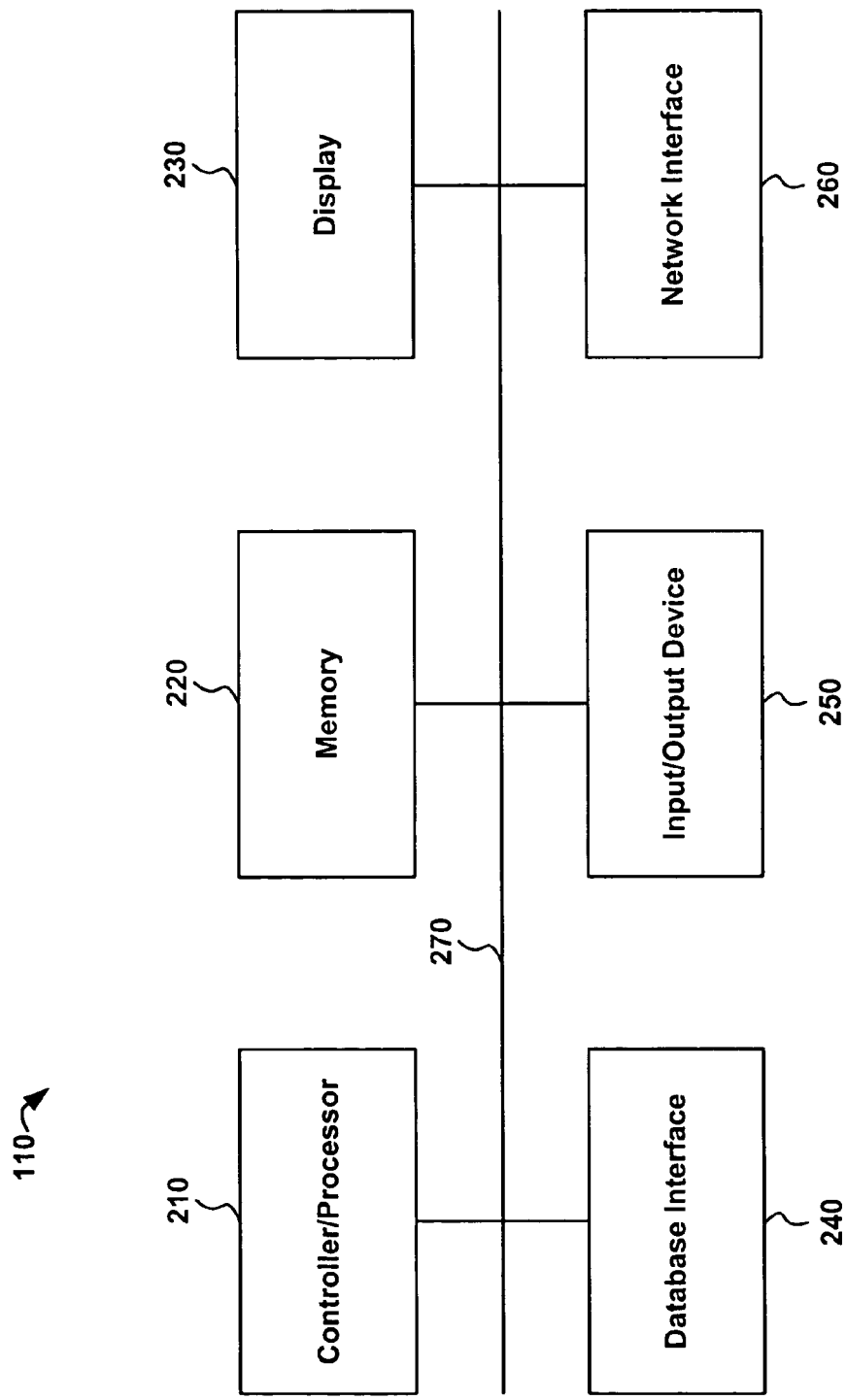
FIG. 2 is a block diagram that depicts the possible structure of a work station in the computer-implemented decision support system of FIG. 1 in accordance with an embodiment of the present invention.

FIG. 2 illustrates a possible configuration of a master terminal 110 (the user terminal 120 may also have a similar configuration). The master terminal 110 may include a controller/processor 210, memory 220, display 230, database interface 240, input/output device interface 250, and network interface 260, connected through bus 270.

The controller/processor 210 may be any programmed processor known to one of skill in the art. However, the decision support method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device or devices capable of implementing the decision support method as described herein can be used to implement the decision support system functions of this invention.

The Input/Output interface 250 may be connected to one or more input devices that may include a keyboard, mouse, pen-operated touch screen or monitor, voice-recognition device, or any other device that accepts input. The Input/Output interface 250 may also be connected to one or more output devices, such as a monitor, printer, disk drive, speakers, or any other device provided to output data.

The memory 220 may include volatile and nonvolatile data storage, including one or more electrical, magnetic or optical memories such as a RAM, cache, hard drive, CD-ROM drive, tape drive or removable storage disk.

The network interface 260 may be connected to a communication device, modem, network interface card, or any other device capable of transmitting and receiving signals over a network 130. The components of the terminals 110, 120 may be connected via an electrical bus 270, for example, or linked wirelessly.

Client software and databases may be accessed by the controller/processor 210 from memory 220 or through the database interface 240, and may include, for example, database applications, word processing applications, the client side of a client/server application such as a billing system, as well as components that embody the decision support functionality of the present invention. The terminals 110, 120 may implement any operating system, such as Windows or UNIX, for example. Client and server software may be written in any programming language, such as ABAP, C, C++, Java or Visual Basic, for example.

Figure 3:
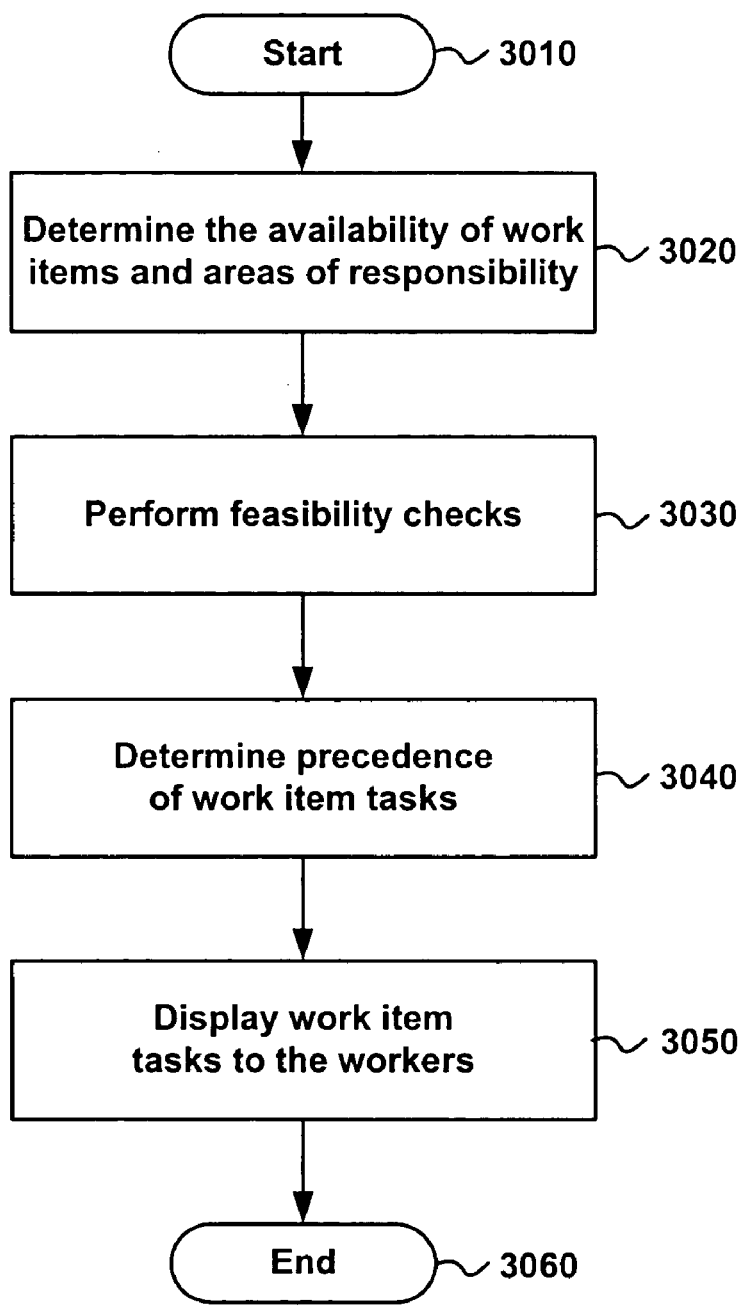
FIG. 3 is a flowchart that depicts a possible computer-implemented decision support process in accordance with an embodiment of the present invention.
Figure 4A:
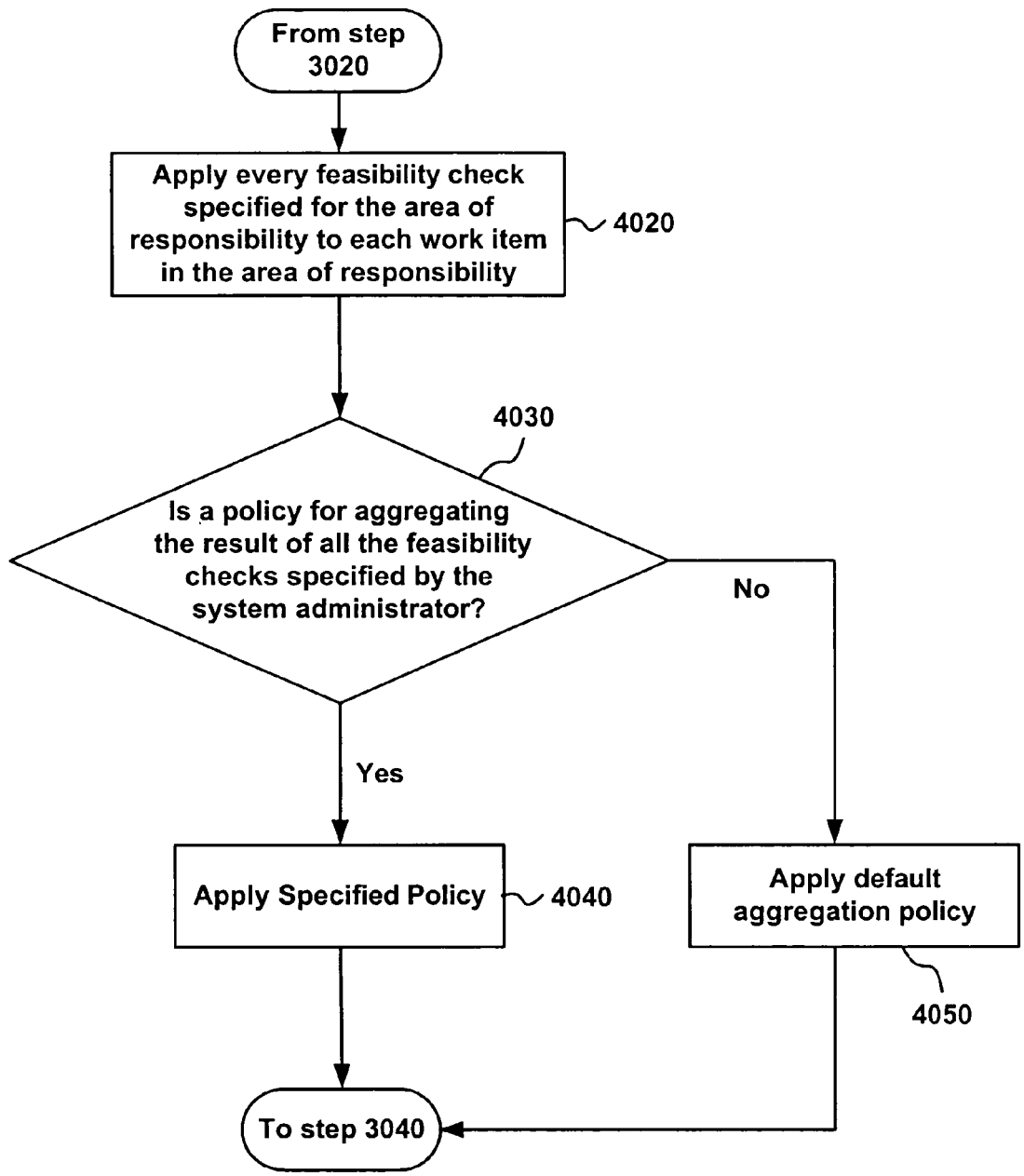
FIG. 4a is a flowchart that depicts a possible feasibility evaluation process performed in the computer-implemented decision support process of FIG. 3 in accordance with an embodiment of the present invention.
Figure 4B:
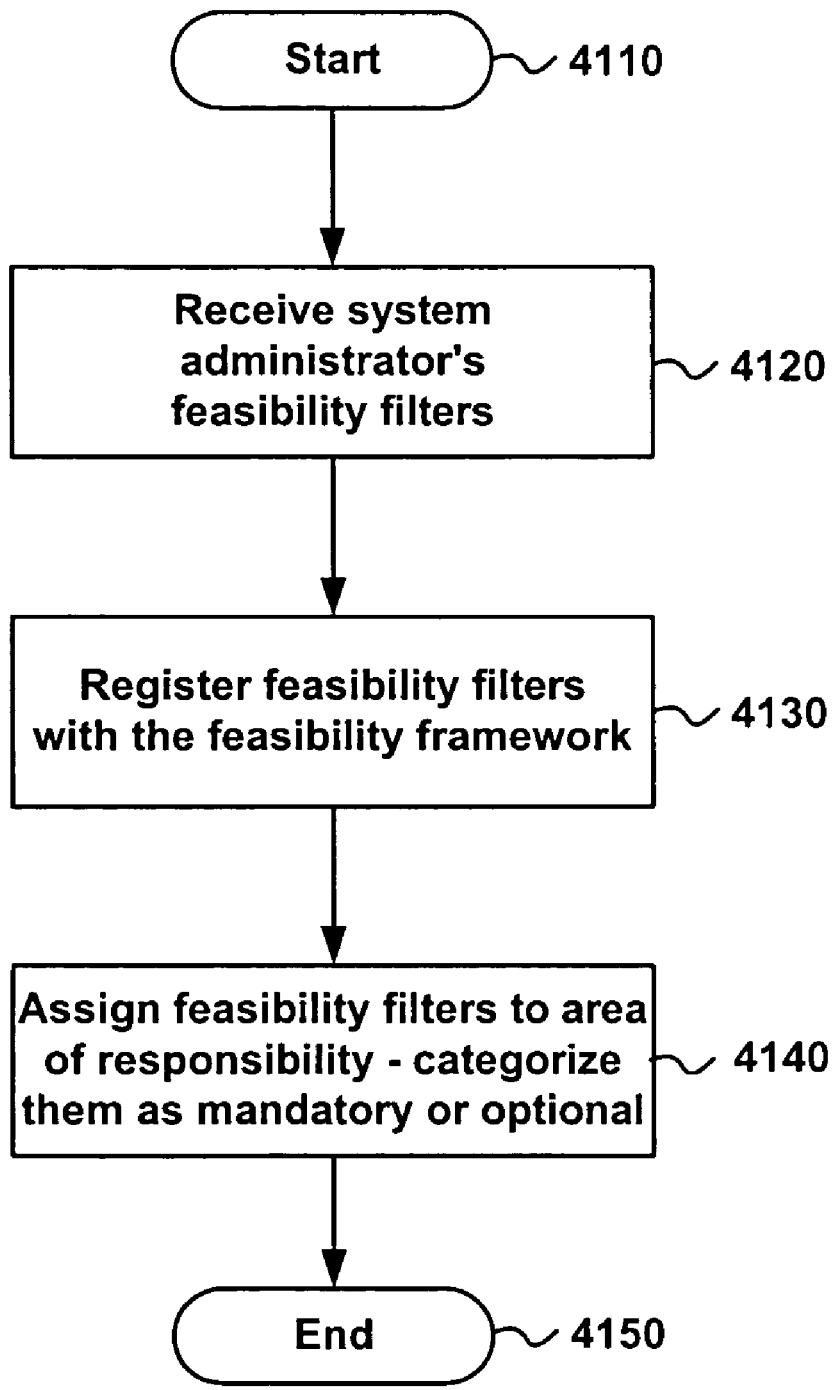
FIG. 4b is a flowchart that depicts how shop floor management and system administrator can influence the feasibility evaluation process of FIG. 4a in accordance with an embodiment of the present invention.
Figure 5A:
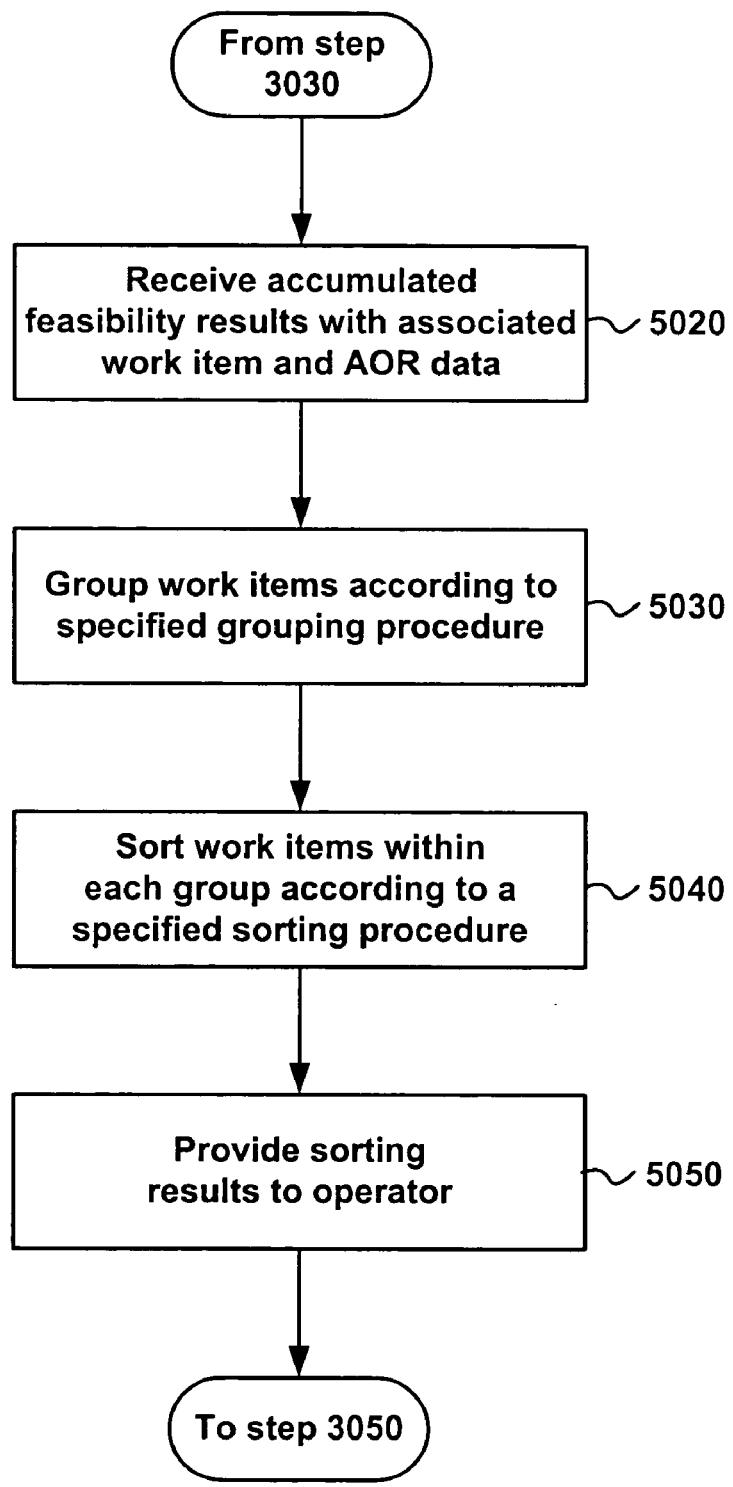
FIG. 5a is a flowchart that depicts a possible precedence process performed in the computer-implemented decision support process of FIG. 3 in accordance with an embodiment of the present invention.
Figure 5B:
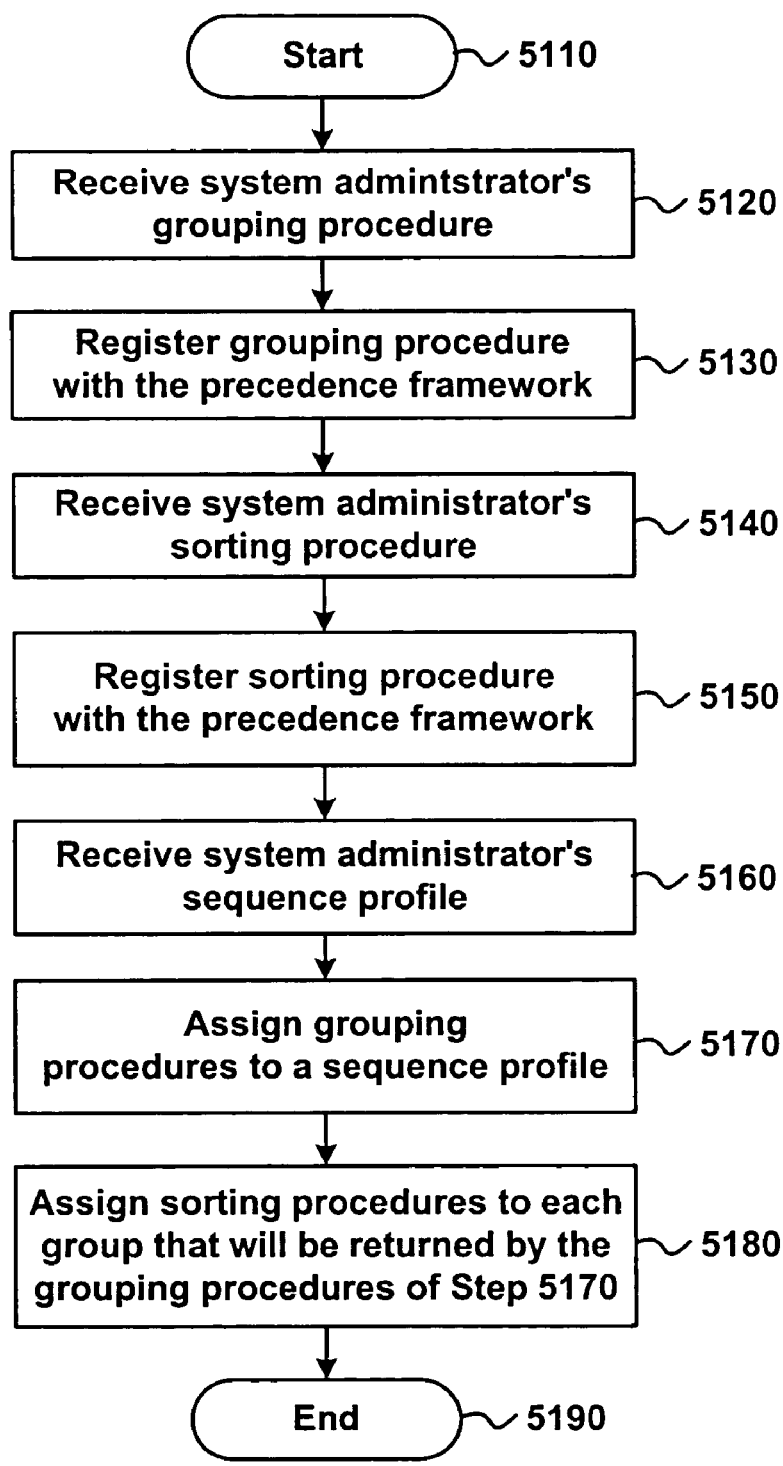
FIG. 5b is a flowchart that depicts how shop floor management and computer administrator can influence the precedence determination process of FIG. 5a in accordance with an embodiment of the present invention.

FIGS. 3, 4a-b and 5a-b are flowcharts that depict a possible computer-implemented decision support process in accordance with an embodiment of the present invention. FIG. 3 depicts the overall flowchart while FIGS. 4a and 5a depict more detailed flowcharts of the feasibility and precedence steps, respectively. FIGS. 4b and 5b depict a flowchart showing how management can setup feasibility and precedence framework to achieve a desired outcome from the process shown in FIGS. 3, 4a, and 5a.

With respect to FIG. 3, the process begins at step 3010 and proceeds to step 3020 where the controller/processor 210 determines the availability of the work items and the area of responsibility. The work item can be assembling one or more components on to the work-in-progress, apply a finishing process on a product, etc.

The areas of responsibility depend on the structure and function of the work place and the nature of the business. For example, the area of responsibility could be milling, shipping, lathing, design, copying, maintenance, etc. The area of responsibility could be something more specific, such as milling product A & B on Milling Machine 1 & 2, transferring material from Location A to Location B, etc. The area of responsibility may be associated with one or more workers. If one of the workers is sick or on vacation, for example, his or her area of responsibility duties may shift to another worker.

In step 3030, the controller/processor 210 performs one or more feasibility checks. FIG. 4a is a flowchart of a possible feasibility check process shown in step 3030 in FIG. 3. In step 4020, the controller/processor 210 applies the necessary feasibility filters based on the area of responsibility data to each work item and store the result. Feasibility of completing work item tasks is dependent on, for example, work-in-progress availability and component availability. The feasibility filters are automatic, predetermined and selected by the system administrator.

System administrators may also develop their own feasibility filters and apply them to an area of responsibility. FIG. 4b shows this process. The process begins at step 4110, and proceeds to step 4120 where the controller/processor 210 receives from the system administrators feasibility filters written to the system administrators' specifications. In step 4130, the processor/controller 210 registers the feasibility filters with the feasibility framework. In step 4140, the processor/controller 210 assigns the feasibility filters to an area of responsibility, categorizing them as mandatory or optional. The process proceeds to step 4150 and ends. The feasibility filters may also be mandatory or optional, which influences the default aggregation in step 4050 of FIG. 4a.

In step 4030, the controller/processor 210 assigns feasibility filters to one or more areas of responsibility. For example, the system operator may want to perform feasibility checks for an area of responsibility described as "Setup and production of any product on lathe 1 and 2." The possible mandatory filters may be the work-in-progress availability, tool availability, resource availability, for example.

In step 4040 and 4050, the controller/processor 210 accumulates and processes the feasibility filtering results. The results may be presented to the user on a display or in hardcopy automatically, or upon system operator request through a push of a button, for example. The results for default aggregation in step 4050 are "Passed all the mandatory and optional filters", "Passed all the mandatory filters and failed some of the optional filters", and "Failed one or more mandatory filters." As mentioned above customers can have their own aggregation policy. The system 100 may not allow the system operator to execute the work item based on the failure of the feasibility check or may provide for a system operator override. The process then proceeds to step 3040 in FIG. 3.

Back to FIG. 3, after the feasibility check is complete, in step 3040, the controller/processor 210 determines the precedence of work item tasks based on the results of the feasibility checks. The precedence procedures may be performed individually as selected by the system operator or may be performed automatically in accordance with a precedence profile. The precedence profile may have various grouping and sorting procedures assigned according to a particular area of responsibility, works item in-progress, or available work items, for example.

FIG. 5b shows the steps a system administrator should take to create and assign a precedence profile. The process begins at step 5110, and proceeds to step 5120 where the controller/processor 210 receives from the system administrators grouping procedures written to the system administrators' specifications. In step 5130, the processor/controller 210 registers the grouping procedures with the precedence framework. In step 5140, the controller/processor 210 receives from the system administrators sorting procedures written to the system administrators' specifications. In step 5150, the processor/controller 210 registers the sorting procedures with the precedence framework. In step 5160, the controller/processor 210 receives a sequence profile defined by the system administrators. In step 5170, the processor/controller 210 assigns the grouping procedures to a sequence profile. In step 5180, the processor/controller 210 assigns the sorting procedures to each group that will be returned by the grouping procedures of Step 5170. The process proceeds to step 5190 and ends.

FIG. 5a is a flowchart of a possible precedence determination process shown in step 3040 in FIG. 3. In step 5020, the controller/processor 210 receives accumulated feasibility results with associated work item and area of responsibility data. In step 5030, the controller/processor 210 groups work items tasks according to a specified grouping procedure. The grouping procedure may be automatic, one of a predetermined number which are then selected by the system operator. The groups for the work item tasks may be defined as "Hot jobs", "Normal jobs", or "Low jobs", for example.

In step 5030, the controller/processor 210 sorts work items tasks within each group according to a specified sorting procedure. The sorting procedure may be automatic, one of a predetermined number which are then selected by the system operator. Examples of sorting procedures may be earliest start time, shortest processing time, earliest due date, etc. In step 5050, the controller/processor 210 provides the sorting results in the form of one or more worklists to the system operator. Possible worklists parameters and descriptions are discussed below in relation to FIG. 6. The process then proceeds to step 3050 in FIG. 3.

Back in FIG. 3, in step 3050, the controller/processor 210 displays a worklist to the workers listing the work item tasks for each worker to perform, along with other necessary information. The process proceeds to step 3060 and ends.

FIG. 6 is a possible example of a worklist generated by the computer-implemented decision support system 100. The worklist may be displayed at the terminals 110, 120, or printed on hardcopy for the worker. Along with listing the work item tasks to be performed, the worklist may display a plurality of items related to the work tasks, including the name of the worker, his/her area of responsibility, the work item designation and description, the time allocated to complete the task, status, feasibility, priority, diagrams and instructions on how to perform the tasks, etc., plus any other communication links, pull-down menus, graphical user interfaces (GUIs), etc.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented decision support method, comprising:
   determining, by a first computing device, availability of work items and areas of responsibility for a work in progress, the work in progress comprising the work items, each work item assigned to an area of responsibility and comprising at least one work item task, and each area of responsibility associated with at least one user;
   registering a feasibility filter with a feasibility framework implemented in the first computing device, the feasibility filter setting a threshold condition with respect to availability of an aspect of a work item;
   assigning at least one feasibility filter registered in the feasibility framework to an area of responsibility, each assigned filter designated as mandatory or optional;
   applying the at least one feasibility filter to the at least one work item task assigned to the area of responsibility, wherein the at least one work item task is feasible if the work in progress is available and resources needed to complete the at least one work item task are available in a quantity greater than specified in the at least one feasibility filter;
   determining feasibility of completing work item tasks by comparing an aggregated set of results of the application of the at least one feasibility filter to a customizable aggregation policy, wherein the completion of the work item tasks is feasible if the aggregated set of results meets criteria specified in the customizable aggregation policy;
   determining precedence of the work item tasks to be performed based on the determined feasibility, the determined availability of work items, and the determined areas of responsibility, said determining comprising:
      accessing a precedence profile that defines grouping procedures for grouping the work item tasks into groups and sorting procedures for sorting the grouped worked item tasks within each group;
      automatically grouping the work item tasks into the groups using the grouping procedures;
      responsive to said automatically grouping, automatically sorting the grouped work item tasks within the each group using the sorting procedures; and
   outputting, at a second computing device in communication with the first computing device, one or more worklists that list work item tasks to be performed based on the determined precedence and the determined feasibility of work item tasks.

2. The method of claim 1, wherein determining feasibility includes applying a set of feasibility filters and aggregating an output of the feasibility filters.

3. The method of claim 2, further comprising dividing the set of feasibility filters into a subset of mandatory feasibility filters and a subset of optional feasibility filters.

4. The method of claim 3, wherein a system administrator sets a policy to aggregate the output of the feasibility filters.

5. The method of claim 3, wherein a default policy is used to aggregate the output of the feasibility filters.

6. The method of claim 2, wherein a system administrator develops the set of feasibility filters.

7. The method of claim 1, wherein a system administrator creates the precedence profile.

8. The method of claim 1, wherein a system administrator writes the grouping procedure and the sorting procedure.

9. A computer system, comprising:
   a memory that stores data representing work items and areas of responsibility for a work in progress, the work in progress comprising the work items, each work item assigned to an area of responsibility and comprising at least one work item task, and each area of responsibility associated with at least one user;
   a processor/controller that determines availability of work items and areas of responsibility, that registers a feasibility filter with a feasibility framework implemented in the computer system, the feasibility filter setting a threshold condition with respect to availability of an aspect of a work item, that assigns at least one feasibility filter registered in the feasibility framework to an area of responsibility, each assigned filter designated as mandatory or optional, that applies the at least one feasibility filter to the at least one work item task assigned to the area of responsibility, wherein the at least one work item task is feasible if the work in progress is available and resources needed to complete the at least one work item task are available in a quantity greater than specified in the at least one feasibility filter, that determines feasibility of completing work item tasks by comparing an aggregated set of results of the application of the at least one feasibility filter to a customizable aggregation policy, wherein the completion of the work item tasks is feasible if the aggregated set of results meets criteria specified in the customizable aggregation policy, and that determines precedence of the work item tasks to be performed based on the determined feasibility, the determined availability of work items, and the determined areas of responsibility, wherein the precedence is determined by:
      accessing a precedence profile that defines grouping procedures for grouping the work item tasks into groups and sorting procedures for sorting the grouped worked item tasks within each group;

automatically grouping the work item tasks into the groups using the grouping procedures; and responsive to said automatically grouping, automatically sorting the grouped work item tasks within the each group using the sorting procedures; and an input/output device that outputs one or more worklists that list work item tasks to be performed based on the determined precedence and the determined feasibility of work item tasks.

10. The computer system of claim 9, wherein the processor/controller determines feasibility by applying a set of feasibility filters and aggregating an output of the feasibility filters.

11. The computer system of claim 10, wherein the processor/controller divides the set of feasibility filters into a subset of mandatory feasibility filters and a subset of optional feasibility filters.

12. The computer system of claim 11, wherein the processor/controller and the input/output device receives from a system administrator a policy to aggregate the output of the feasibility filters.

13. The computer system of claim 11, wherein the processor/controller uses a default policy to aggregate the output of the feasibility filters.

14. The computer system of claim 10, wherein the processor/controller and the input/output device receives the set of feasibility filters from a system administrator.

15. The computer system of claim 9, wherein the processor/controller and the input/output device receives the precedence profile from a system administrator.

16. The computer system of claim 9, wherein the processor/controller and the input/output device receives the grouping procedure and the sorting procedure from a system administrator.

* * * * *